United States Patent
Kobuchi et al.

(10) Patent No.: US 12,299,737 B2
(45) Date of Patent: May 13, 2025

(54) SIMULTANEOUS CAPTURE OF MULTIPLE CHECKS

(71) Applicant: Wells Fargo Bank, N.A., San Francisco, CA (US)

(72) Inventors: John Akira Kobuchi, San Francisco, CA (US); Dennis E. Montenegro, Concord, CA (US); Sadie S. Salim, Mill Valley, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 64 days.

(21) Appl. No.: 18/192,218

(22) Filed: Mar. 29, 2023

(65) Prior Publication Data
US 2024/0331028 A1  Oct. 3, 2024

(51) Int. Cl.
*G06Q 40/02* (2023.01)

(52) U.S. Cl.
CPC ................... *G06Q 40/02* (2013.01)

(58) Field of Classification Search
None
See application file for complete search history.

(56) References Cited

U.S. PATENT DOCUMENTS

| | | | |
|---|---|---|---|
| 5,440,403 A | 8/1995 | Hashimoto et al. | |
| 8,235,284 B1 | 8/2012 | Prasad et al. | |
| 8,406,500 B2 | 3/2013 | Najari et al. | |
| 9,047,317 B2 | 6/2015 | Palmer et al. | |
| 10,007,898 B2 | 6/2018 | Felse et al. | |
| 10,007,899 B2 | 6/2018 | Choi et al. | |
| 10,007,900 B2 | 6/2018 | Royyuru et al. | |
| 10,007,901 B2 | 6/2018 | Lam et al. | |
| 10,007,902 B2 | 6/2018 | Capuozzo et al. | |
| 10,373,007 B2 | 8/2019 | O'neill | |
| 10,552,810 B1 * | 2/2020 | Ethington | G06Q 20/042 |
| 10,706,466 B1 * | 7/2020 | Ethington | G06T 5/40 |
| 2004/0109597 A1 | 6/2004 | Lugg | |
| 2004/0133516 A1 * | 7/2004 | Buchanan | G06Q 20/204 705/42 |
| 2007/0288382 A1 * | 12/2007 | Narayanan | G06Q 20/042 382/137 |
| 2008/0097907 A1 | 4/2008 | Till et al. | |
| 2008/0208727 A1 | 8/2008 | Mclaughlin et al. | |

(Continued)

*Primary Examiner* — Joseph W. King
(74) *Attorney, Agent, or Firm* — SCHWEGMAN LUNDBERG & WOESSNER, P.A.

(57) ABSTRACT

Disclosed in some examples are methods, systems, and machine-readable mediums for simultaneously capturing an image of multiple checks for deposit. An example method includes receiving, by a bank computing system and from a user device, a multi-check image depicting a front side of multiple checks for deposit with a bank during a communication session. The bank computing system may generate a front side image for each of the multiple checks from the multi-check image. The bank computing system may receive electronic signature data for a customer, during the communication session, and generate a back side data for each of the multiple checks using the electronic signature data. A check image file may be stored for each respective check of the multiple checks, with each check image file including the back side data, such as a generated image, and the front side image for the respective check.

20 Claims, 11 Drawing Sheets

(56) References Cited

U.S. PATENT DOCUMENTS

2008/0294514 A1 11/2008 Calman
2014/0297517 A1 10/2014 Gnanasekaran
2020/0126047 A1 4/2020 Megerdichian et al.
2022/0253840 A1 8/2022 Kolchin
2023/0351337 A1* 11/2023 Albero ............... G06Q 20/0425

* cited by examiner

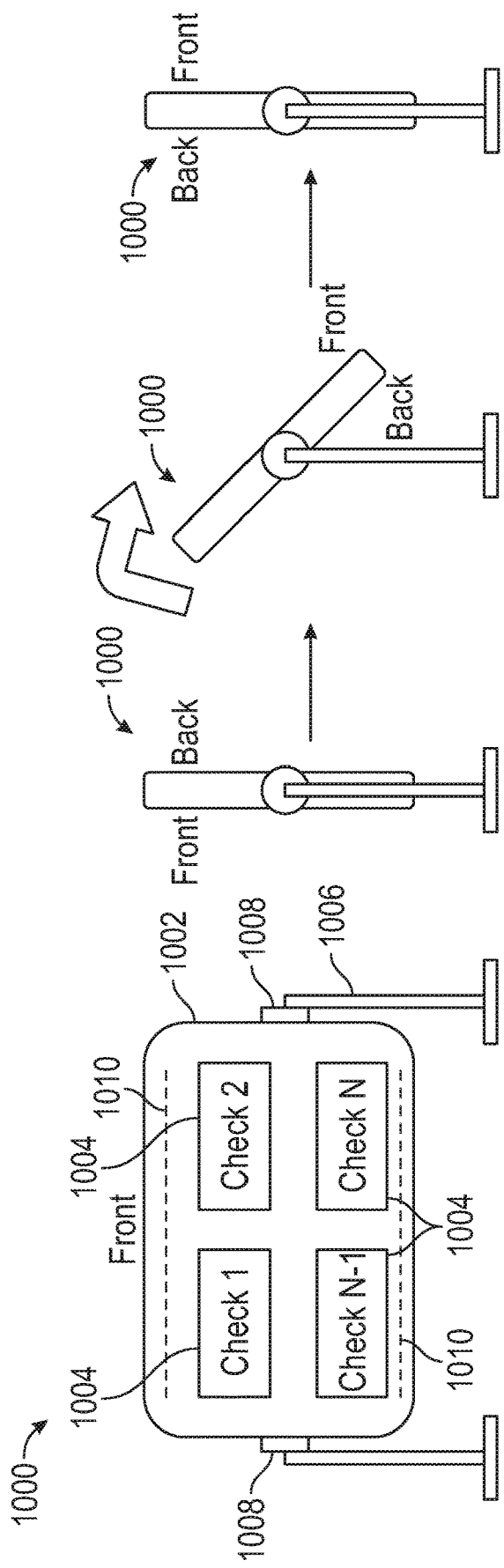

SIMULTANEOUS CAPTURE OF MULTIPLE CHECKS

TECHNICAL FIELD

Embodiments pertain to check image capture. Some embodiments relate to simultaneously capturing an image of multiple checks, processing the image, and depositing the checks.

BACKGROUND

Mobile remote deposit capture (MRDC) of checks is now widely adopted. MRDC allows consumers to capture front and back images of a single check with a mobile device and use the images to deposit the check into their bank account. Given its convenience, MRDC is used to deposit numerous checks in a given year; however, some consumers (such as businesses) often deposit multiple checks at a time and find using MRDC to capture images of each individual check to be tedious and repetitive. In some cases, consumers will instead use a dedicated and costly check scanner to facilitate the process of depositing multiple checks at once.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIGS. 10A-10D illustrate a single plate check holder in accordance with some embodiments.

DETAILED DESCRIPTION

The inventors have recognized that mobile remote deposit capture (MRDC) technology that allows users (e.g., bank customers, depositors, tellers) to capture a single image of multiple checks for deposit suffers from serious technical challenges when generating images of the back sides of the checks. Challenges include difficulty with quickly, accurately, and securely obtaining back side images of the checks. The present disclosure provides techniques (e.g., systems and methods) that may more efficiently (e.g., more quickly, more securely, more accurately, and/or less expensively) generate back side data (e.g., back side images, unique codes) for multiple checks when simultaneously captured (e.g., all of the checks captured in a single image or picture by a mobile device such as a phone or tablet). Facilitating check deposits by customers using the present simultaneous capture techniques may help speed check deposits and reduce processing costs (e.g., avoid using check scanners), thus benefitting both customers and banks.

Figure 1:
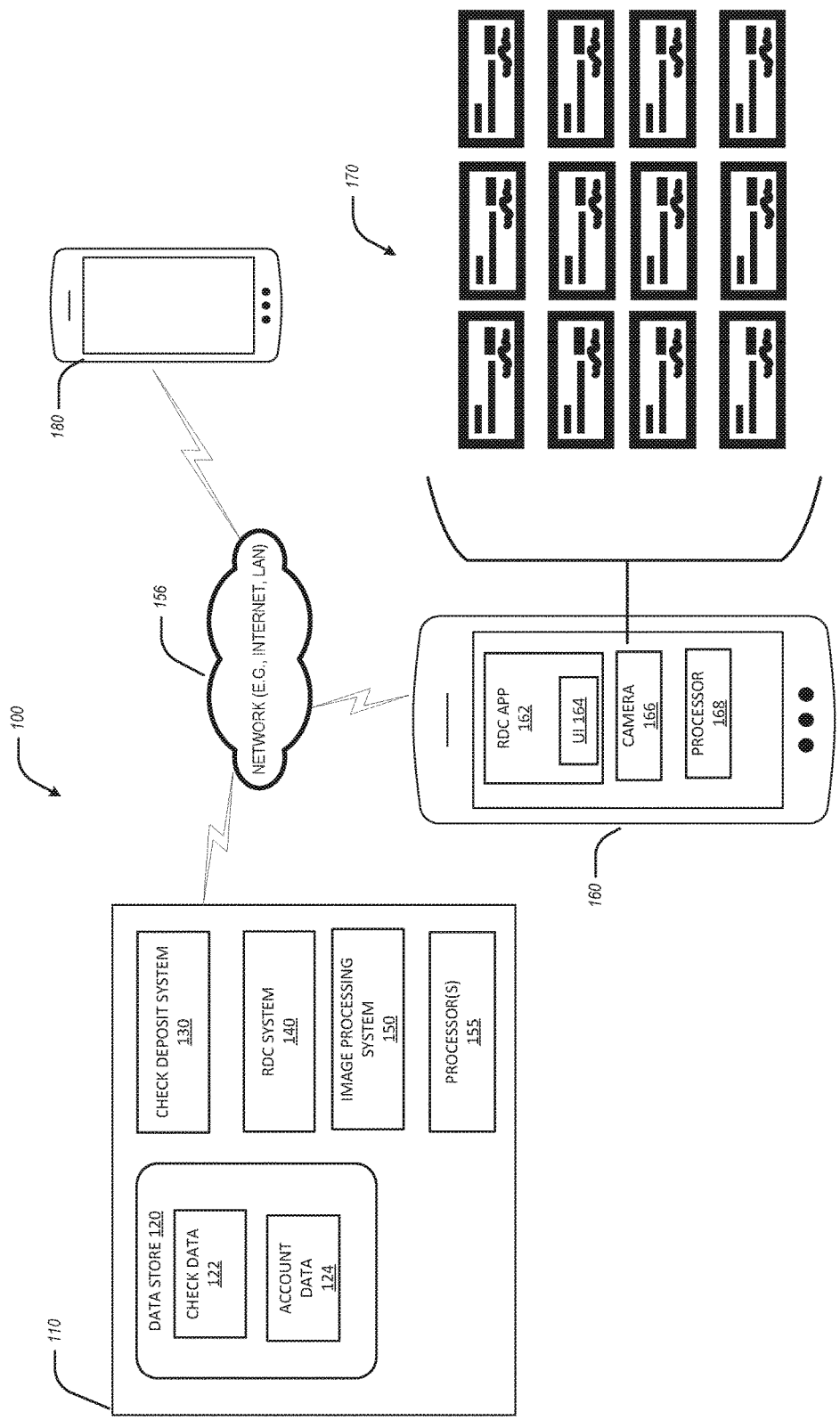
FIG. 1 illustrates an environment and system according to some examples of the present disclosure.

FIG. 1 illustrates an environment 100 for multi check capture using a bank computing system 110 and a user device 160 according to an example of the present disclosure. The environment 100 is illustrative of check capture where a user (e.g., a bank customer or a teller) captures an image of the front sides of multiple checks 170 simultaneously using the user device 160. The environment 100 includes the bank computing system 110 in communication with the user device 160 over a network 156, for example the internet or local area network (LAN). In other examples, the user device 160 may communicate with the bank computing system 110 using a direct communication technique (e.g., NFC, Wi-Fi direct, etc.) in addition to or instead of a network 156. The user device 160 may be a mobile device (e.g., a mobile phone or tablet) or a personal computer. The user device 160 may include memory (not shown), a processor 168, a display (e.g., for presenting a user interface 164), a camera for capturing check images, and a remote deposit capture (RDC) application (app) 162 for handling the capture of multiple checks simultaneously by the user device 160. The RDC app 162 may be part of a mobile banking app that handles other aspects of mobile banking (e.g., transfers, account viewing, single check deposits, etc.) or may be standalone app interfacing with other apps on the user device 160.

The bank computing system 110 may include a data store 120 that may store check data 122 (e.g., images, codes, etc.) and other data such as account data 124 for checking accounts of customers. The data store 120 may include multiple databases on different servers in some examples. The bank computing system 110 further includes a RDC system 140 which communicates with the RDC app 162 to provide back-end processing of checks captured by the user device 160. The bank computing system 110 may also include a check deposit system 130 for processing checks for deposit and an image processing system 150 for processing check images. The RDC system 140 may be part of a mobile banking system (e.g., server-side system) that handles other aspects of mobile banking (e.g., transfers, account viewing, single check deposits, etc.) or may be standalone system interfacing with other systems on the bank computing system 110.

The bank computing system 110 includes one or more processors 155 and may, for example, be deployed across one or several different servers of a financial institution and may interact with other servers of the financial institution as well as with outside systems. For example, the image processing system 150, the check deposit system 130, and the RDC system 140 may all run on different servers in communication with one another. The term bank as used herein means any financial institution that provides check deposit processing including banks and brokerages, as examples. Types of checks that may be captured by a user include, but are not limited to, personal checks, cashier's checks, certified checks, and other negotiable instruments for making payments, for example.

The RDC app 162 generally provides a user interface 164 for the user to remotely deposit multiple checks 170 captured simultaneously. The RDC app 162 may obtain an image of the checks 170 using the camera 166. For example, the RDC app 162 may access the camera 166 and command the camera to obtain an image of the checks 170 either automatically or manually (e.g., upon receipt of a user input). As will be discussed further below, the RDC app 162 may also obtain electronic signature data for the customer, such as a digital signature or a signature button selection, for depositing the checks. In other embodiments, the RDC app 162 may be in communication with a separate device 180 (e.g., a teller pad) which may obtain signature input of the customer, such as a digital signature or a signature button selection. This may be beneficial in bank branches where the user device is a tablet used in a branch by a teller and a teller pad is used to obtain signature input from a customer.

The RDC system 140 may perform a variety of functions. For example, during a communication session, the RDC system 140 may receive an initial front image of the checks 170 from the user device 160 and other user input such as a deposit amount for the checks (in total or individually). The RDC system 140 may send the initial image of the checks 170 to the image processing system 150 for image processing and use the data returned from the image processing system 150 to validate and submit deposit requests to the check deposit system 130.

The image processing system 150 may receive the front image of the checks 170 from RDC system 140 and perform image processing on the image to obtain discrete front image of each check, read the amount of each check, read the account number of each check, and determine a confidence level in the data for each check. This information may then be returned to the RDC system 140 which in turn may handle deposit validation and submission if certain rules are met. A discrete front image of each check may be obtained by performing edge detection on the initial image. Other image processing may be performed on a check image as well, including straightening/leveling of image, flipping it to be right-side-up, contrast/color adjustment, etc. In some examples, this may help to provide a readable check image and accurate OCR of the check image. Each individual check image may be stored as a TIFF image, though other images formats may be used. Optical character recognition (OCR) may be performed on an individual check image by the image processing system 150 to read deposit information on each check. Success and failure or error messages may be sent by the RDC system 150 to RDC app 162. An error message may include identifying a check(s) having an error (e.g., unable to read deposit information, overlapping checks) and requesting the user to retake an image of the identified check(s) or to retake another image of all of the checks.

The RDC system 140 may further receive electronic signature data of the customer during the communication session (e.g., from the user device 160, a separate device 180, or a data store) and generate a back side data (e.g., back image and/or code) for each of the checks using the signature data. In one example, the RDC system 140 may receive a digital signature from the user (e.g., a stylus or finger input) and generate a back side image for each of the multiple checks by applying the digital signature to a back side image for each of the multiple checks. In another example, the RDC app 162 or separate device 180 may receive signature button selection (e.g., a tap of a button or icon), send a message to the RDC system 140, and in response, the RDC system may generate a unique code for each of the multiple checks and associate each unique code with its respective check. The unique code may be an alphanumeric token or QR code stored in a data store (e.g., data store 120) and associated with its respective check, or the unique code may be applied (e.g., overlaid) on a back side image of its respective check and the image with applied code stored in the data store. In other examples, discussed further below, the electronic signature data may include biometric data, a previously-stored digital signature, or an indication that no signature is necessary.

In one example of operation, the RDC app 162 may display a multi-check deposit screen which includes an input field for the amount of the deposit (either total amount for all checks or individual amounts for each check) and a take photo input button for taking a photo of the front sides of the checks (and optionally a button for capturing one or more images of the back sides of the checks). Other features may be displayed as well including cancel and deposit buttons. After a user enters the amount(s) for the checks, the RDC app 162 may activate the take photo button. The user may then take a photo of the front sides of all of the checks 170. The RDC app 162 may send the captured multi-check image of all of the checks (or a compressed and/or resized version of the captured image) to the RDC system 140 for further processing. The RDC app 162 may also receive a deposit input button selection from the user and send user-entered deposit information (e.g., amount of each check and/or a total amount of the checks, a deposit account, etc.) to the RDC system 140.

In the various ways discussed above, the bank computing system 110 may process multiple checks, captured simultaneously, for deposit using a signature data for the customer without needing the customer to sign each individual check. This greatly improves the efficiency (e.g., more quickly, more securely, more accurately, and/or less expensively) of generating back side data (e.g., back images and/or codes) for checks when simultaneously captured. Facilitating check deposits by customers using the present simultaneous capture techniques may help speed check deposits and reduce processing costs (e.g., avoid using check scanners), thus benefitting both customers and banks.

Figure 2:
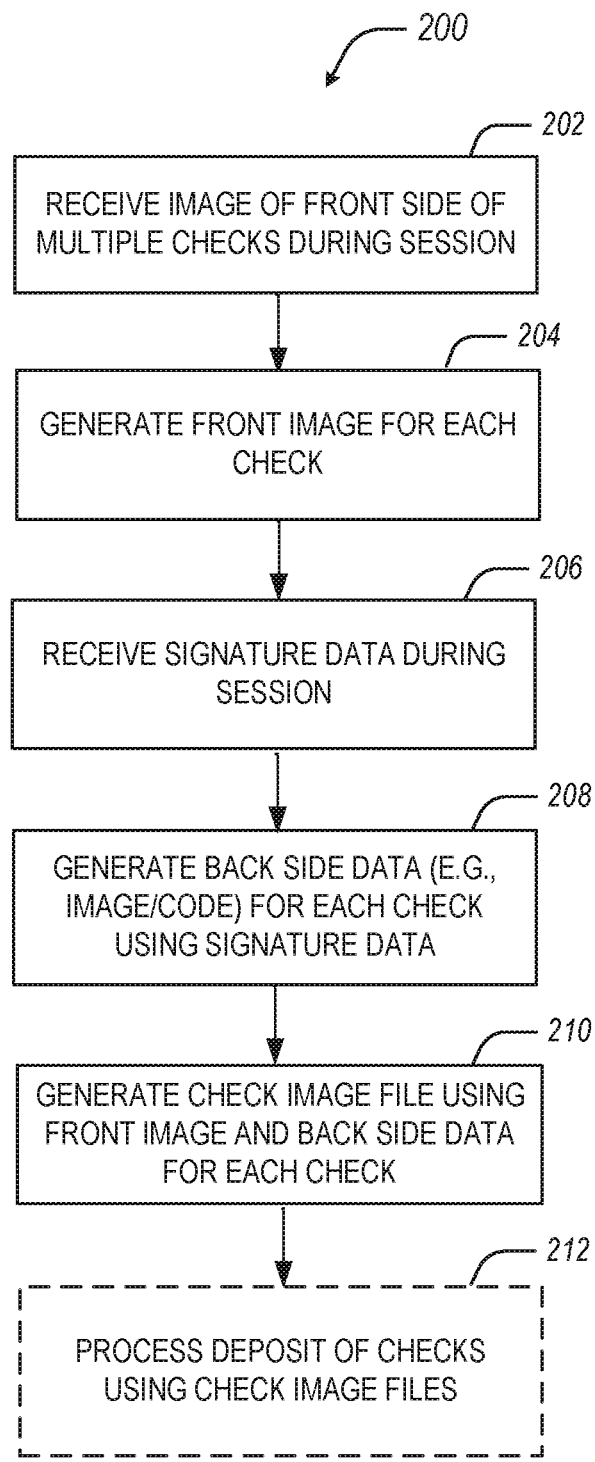
FIG. 2 illustrates a flowchart of a method of simultaneously capturing checks for deposit using generated back side data, according to an example of the present disclosure.

FIG. 2 illustrates a flowchart of a method 200 of capturing an image of multiple checks simultaneously for deposit, according to examples of the present disclosure. Method 200 may be performed by a computing system, having one or more processors and memory, such as the bank computing system 110 discussed above, for example. The method 200 may be carried out by a bank computing system (e.g., system 110) and a user device (e.g., user device 160) and optionally a separate mobile device (e.g., device 180) during a single communication session. A single communication session means a communication session that is continuous or a communication session that occurs during one login session without the user logging out and back in.

At operation 202, the method includes receiving a multi-check image of the front side of multiple checks from a user device during a communication session. The user device may be customer's mobile phone or tablet (e.g., an iPad) or may be a mobile phone or tablet used by a teller or other representative of a bank branch, as examples. The image may be an image captured by the user device automatically or manually (e.g., in response to a user pressing an image capture button) or a modified version of a captured image (e.g., a compressed and/or resized version of the captured image).

At operation 204, the method includes generating a front image for each of the multiple checks from the multi-check image. This may include performing image processing on the multi-check image to identify each check and store a discrete image (e.g., a TIFF image) of the front side of each individual check using, for example, edge detection techniques. The method 200 may further include using optical character recognition (OCR) to read the MICR line of the front image for each of the multiple checks. In an example, the method 200 may further include sending to the user device an error message if, for example, one or more of the checks was not captured properly. The error message may identify the incorrectly captured check(s) and provide a reason for the error (e.g., checks are overlapping, or a check is unreadable, etc.). The method may further include sending to the user device an individual image of each check so the user can see the check was captured. The method may also include showing the amount of each check (e.g., amount obtained via OCR and/or the user-entered amount) so the user can see the deposit amount for each check.

At operation 206, the method includes receiving electronic signature data for a customer, during the communication session, for the multiple checks. The electronic signature data may be received from the user device (e.g., via a user interface of the user device) or from a separate device (e.g., via a user interface of the separate device, or from a data store). In one example, the user device may receive a digital signature from a customer (e.g., a stylus or finger input signature) through its user interface and send the digital signature to the bank computing system. In another example, a separate device (such as a bank teller pad) may receive a digital signature from a customer (e.g., a stylus or finger input signature) through its user interface and send the digital signature to the bank computing system. In this example, the user device may be operated by a bank teller to capture the multi-check image. In another example, the electronic signature data may be a message received from the user device or a separate device in response to the selecting (e.g., tapping) a signature button on the UI of the user device or the separate device. As discussed below, in response to receiving a message based on a signature button selection, the method may include generating a unique code, such as an alphanumeric token or QR code, to associate with each check. In another example, the electronic signature data may include a digital signature for the customer obtained from a data store. In this example, the customer's signature may have been obtained earlier (e.g., during account set up) and stored in a database for retrieval. In another example, the electronic signature data may be an indication that a signature is unnecessary. In this example, the bank or the customer may have indicated at an earlier time (e.g., during account set up) that a manual signature for a check deposit is waived. This information may be stored in a database and queried by the bank computing system. In yet another example, the electronic signature data may be biometric data for the customer (e.g., face data, fingerprint data, eye data). For example, biometric data for the customer may be obtained using the camera or fingerprint button of a user device or a separate device (e.g., bank teller pad or tablet) and sent to the bank computing system for verification. In the examples where the electronic signature data is an indication that a signature is not necessary or is biometric data, the method may also include generating a unique code, such as an alphanumeric token or QR code, to associate with each check, as discussed herein.

At operation 208, the method includes generating back side data (e.g., back image and/or code) for each of the multiple checks using the electronic signature data. In one example, where the electronic signature data includes receiving a digital signature of the customer (e.g., from a stylus input, a data store, etc.), generating the back side data for each of the multiple checks may include generating a back side image by applying the digital signature to a base back side image for each of the multiple checks. In another example, where receiving the electronic signature data includes receiving a signature button selection or biometric data (or an indication that no signature is necessary), generating the back side data for each of the multiple checks may include generating a unique code for each of the multiple checks and associating the unique code with a respective check. Associating the unique code with of the respective check may include applying (e.g., overlaying) the code on a base back side image and/or storing the unique code in a data store with an association with its respective check (e.g., associating the unique code in the data base with a front side image of a check or a base back side image of the check).

A base back side image may be obtained in multiple ways. In one example, a base back side image for a check may be generated from a captured image of the back side of the check taken by the user device. For example, the user device may capture an image of the back sides of one or more (e.g., all) of the checks and send this image (or a modified version thereof) to the bank computing system to identify individual check back sides, match each check back side to its respective front side, and store the back side image of each check. In another example, the method may include obtaining a generic back side image (e.g., an image of one check's back side, a default back side, a template backside with a modification such as a user signature, etc.) to use as the back side image of a check. In yet another example, a bank computing system may select a back side image for a check from a database of back side images using machine learning, for example. This may include using the front side image of a check and a machine learning algorithm to select a back side image for the respective check that matches with its front side image. In some examples, the back side image may be simulated by obtaining a signature or other data, without generating an image.

At operation 210, the method includes generating (e.g., storing) a check image file for each respective check of the multiple checks. Each check image file may include the back side data such as a back side image (e.g., TIFF image or other format) and/or unique code (from operation 208) and the front side image (from operation 204) for the respective check. The check image file may be stored in a data store by the bank computing system and used by the bank computing system (e.g., as shown at operation 212) to process a deposit (e.g., using the check image file as a substitute check for the actual check). In some examples, operation 210 may be carried out by storing the front side image in its check image file as part of operation 204, and storing the back side data (e.g., image and/or code) in the check image file as part of operation 208. Where the check image file includes front and back side images of a check, the check image file may conform to Check 21 standards. In some examples, operation 212 may include sending the check image file to one or more other financial institutions (e.g., a clearinghouse, a federal reserve bank, a check writer's bank, etc.) for processing the deposit of the check.

The method 200 may further include a number of other features, for example. The bank computing system may verify the data for a deposit transaction for each check and display any errors. For each check, the bank computing system may verify MICR data is valid, verify that customer-entered and OCR's amounts match, and verify the check has not already been deposited or is not a fake to prevent fraud and duplicate deposits. The bank computing system may present the user with the check images as captured and as generated and/or augmented by image processing. This may include sending individual check images for display on the user device. The bank computing system may also present the user with itemized information such as check numbers and amounts and also totals for the multi-check deposit. In some examples, the bank computing system may present an option on the user device for cash back, which may be limited to a maximum amount. This may include providing input buttons for the user to accept or reject a cash back offer, verify or modify information (such as desired cash back amount), etc. These other features of method 200 may be implemented as part of operation 212 (processing a deposit) or at other stages during the operation of method 200.

Figure 3:
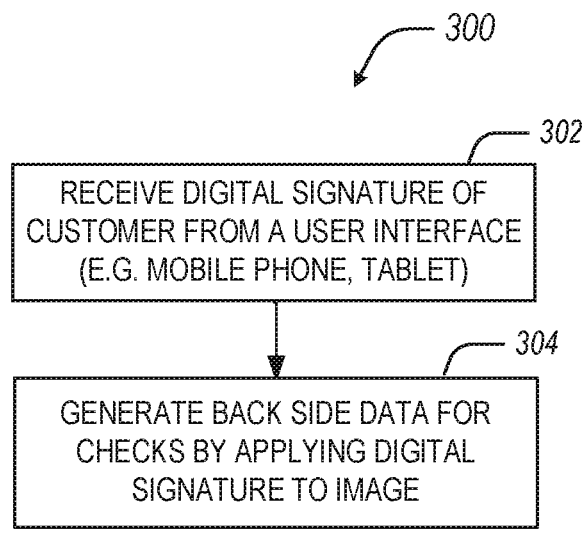
FIG. 3 illustrates a flowchart of a method of generating back side data for checks, according to an example of the present disclosure.

FIG. 3 illustrates a flowchart of a method 300 of generating back side data for checks, according to an example of the present disclosure. The method 300 may be carried out by a bank computing system (e.g., system 110) and a user device (e.g., user device 160) and optionally a separate mobile device (e.g., device 180). At operation 302, a bank computing system may receive a digital signature of a customer from a user interface of the user device or a separate device such as a teller pad. The customer may provide the digital signature by signing in a signature entry location of the user device UI or the separate device UI using, for example, their finger or a stylus. In other examples, rather than receiving a signature from the customer at the time of check capture, the bank computing system may receive a pre-existing digital signature for the customer from a data store. The pre-existing digital signature may have been obtained earlier (e.g., at account set up), stored in a database as part of the customer's account, and may be received from the data store upon a query by the bank computing system. At operation 304, the bank computing system may generate a back side data (e.g., image) for each of the checks being deposited by applying (e.g., overlaying) the digital signature on a base back side image of each check. A base back side image for a check may be obtained using the techniques described above.

Figure 4:
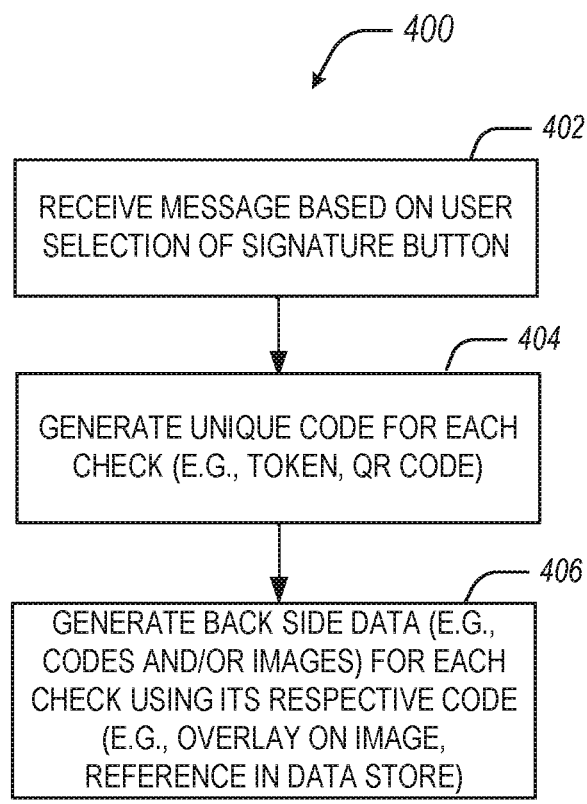
FIG. 4 illustrates a flowchart of a method of generating back side data for checks, according to an example of the present disclosure.

FIG. 4 illustrates a flowchart of a method 400 of generating back side data of checks, according to an example of the present disclosure. The method 400 may be carried out by a bank computing system (e.g., system 110) and a user device (e.g., user device 160) and optionally a separate mobile device (e.g., device 180). At operation 402, the method may include the bank computing system receiving a message indicating a signature button was selected (e.g., by a customer) from the UI of the user device or the separate device. At operation 404, in response to receiving the signature button selection message, the method may include generating a unique code, such as an alphanumeric token or QR code, for each check. At operation 406, the method may include associating each unique code with a respective check. For each check, this may include applying (e.g., overlaying) the code on a base back side image of the check and/or storing the unique code in a data store with an association with a front side image of the respective check. The back side image may be a base back side image obtained using the methods herein.

Figure 5:
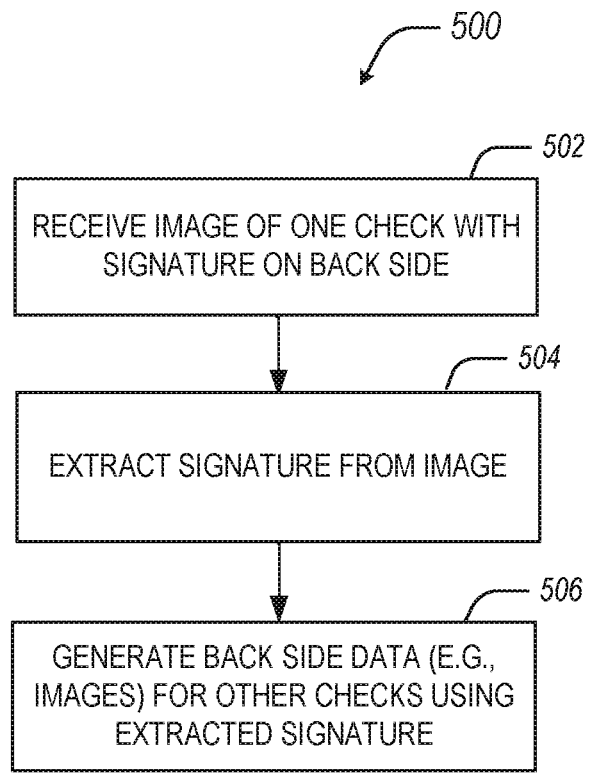
FIG. 5 illustrates a flowchart of a method of generating back side data for checks, according to an example of the present disclosure.

FIG. 5 illustrates a flowchart of a method 500 of generating back side data of checks, according to an example of the present disclosure. The method 500 may be carried out by a bank computing system (e.g., system 110) and a user device (e.g., user device 160) and optionally a separate mobile device (e.g., device 180). At operation 502, the method may include a bank computing system receiving from a user device an image of the back side of one of the checks which has a signature. In one example, the user device may prompt the user to obtain an image of the back of a signed check and send the captured image (or a modified version thereof) to the bank computing system. At operation 504, the method may include extracting the signature from the image. At operation 506, the bank computing system may generate back side images of the other checks using the extracted signature. For example, the extracted signature may be applied to (e.g., overlaid on) the back side images of the other checks. The back side images may be base back side images obtained using the methods herein.

Figure 6:
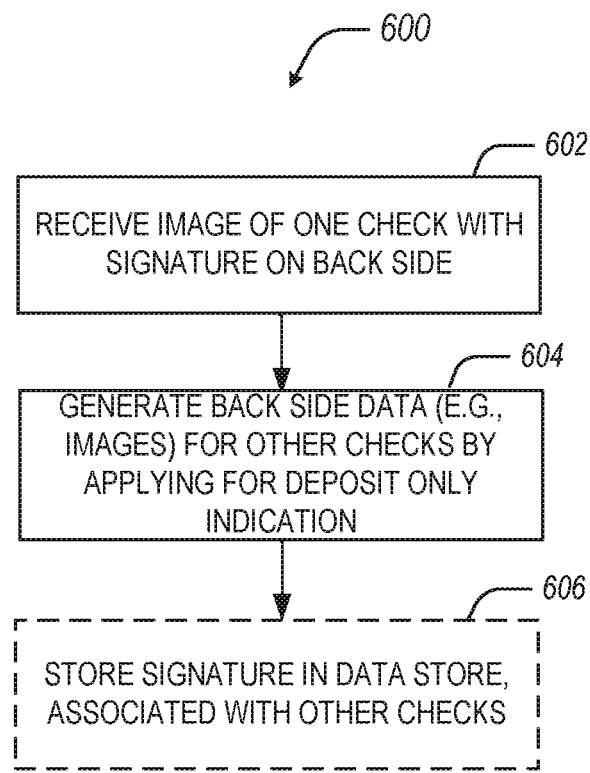
FIG. 6 illustrates a flowchart of a method of generating back side data for checks, according to an example of the present disclosure.

FIG. 6 illustrates a flowchart of a method of generating back side data of checks, according to an example of the present disclosure. The method 600 may be carried out by a bank computing system (e.g., system 110) and a user device (e.g., user device 160) and optionally a separate mobile device (e.g., device 180). At operation 602, the method may include receiving (e.g., with a bank computing system from a user device) an image of the back side of one of the checks which has a signature. In one example, the user device may prompt the user to obtain an image of the back of a signed check and send the captured image (or a modified version thereof) to the bank computing system. At operation 604, back side images of the other checks may be generated by the bank computing system by applying (e.g., overlaying) a "deposit only" indication on the back side images which may be obtained in a manner discussed above. In some examples, a deposit account number may also by applied on the back side images. At operation 606, the method may include storing an image with the signature in a data store and associating the back side images of the other checks with the image of with the signature.

Figure 7:
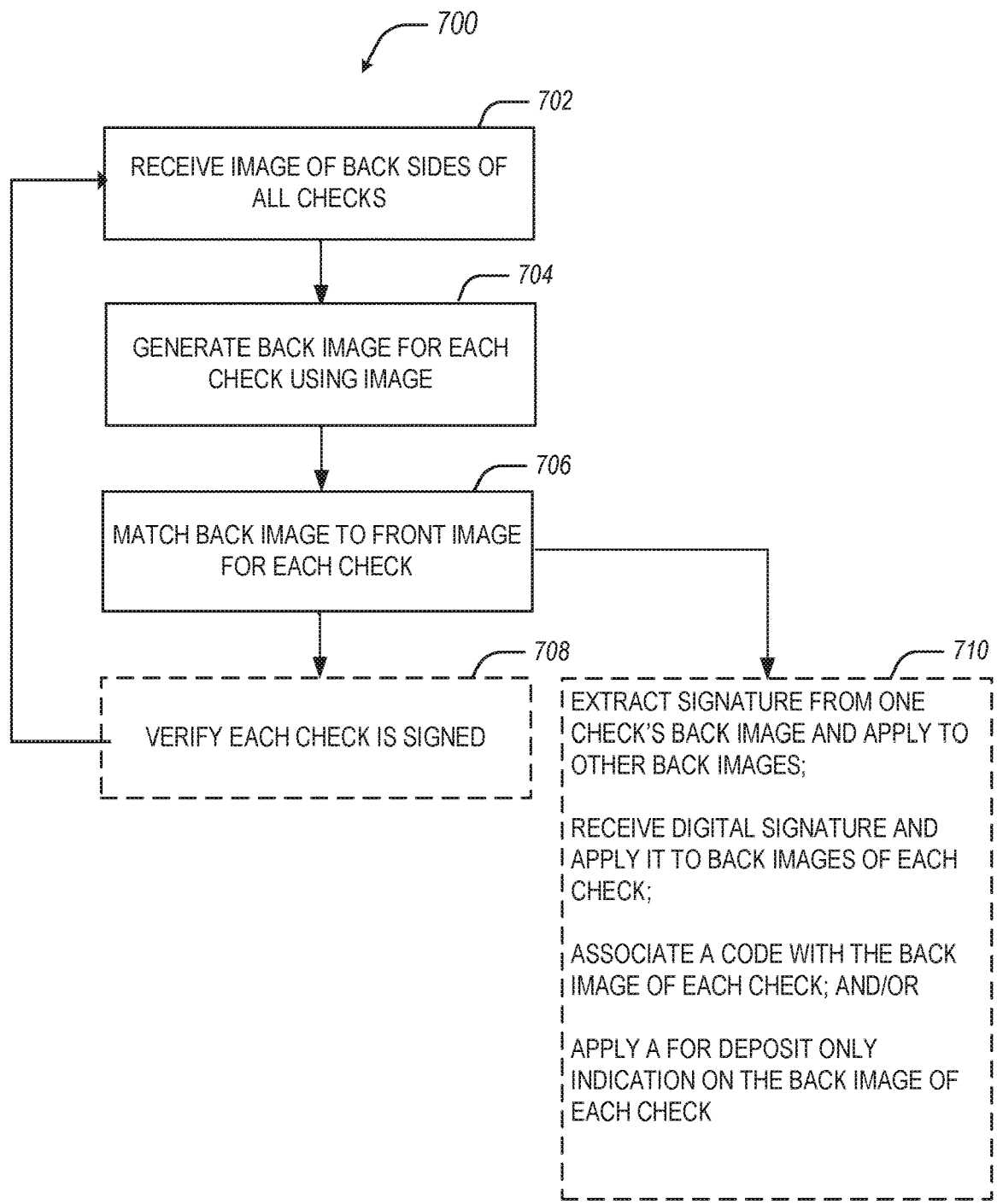
FIG. 7 illustrates a flowchart of a method of generating back side data for checks, according to an example of the present disclosure.

FIG. 7 illustrates a flowchart of a method of generating back side data of checks, according to an example of the present disclosure. The method 700 may be carried out by a bank computing system (e.g., system 110) and a user device (e.g., user device 160) and optionally a separate mobile device (e.g., device 180). At operation 702, the method may include a bank computing system receiving a multi-check image of the back sides of all of the checks from a user device. The multi-check image may be received by a user device using a camera. Operation 702 may, for example, occur after receiving an image of the fronts sides of the checks and generating an individual front side image for each check. In one example, the bank computing device may send an instruction to the user device to have the user turn over each of the checks (e.g., while keeping the checks in the current location). In another example, the user may place the checks in a transparent check holder for imaging, and the bank computing device may send an instruction to the user device to have the user turn over the check holder to capture an image of the back sides of the checks.

At operation 704, the method includes generating a back side data for each of the checks using the multi-check image of check back sides from operation 702. This may include using edge detection to identify each individual check and storing an image of the check back side. At operation 706, the method may include matching each back side image to a respective front side image for each check. This may include using a machine learning engine to determine which back side image matches which front side image. The machine learning engine may, for example, make the determination using a trained model (associating certain front sides of checks with certain back sides of checks), check dimensions, surface characteristics, folds, etc.

At operation 708, the method may include optionally verifying that each check is signed. This may include using image processing to detect a signature at an endorsement location of each check. If one or more of the checks is not signed, the bank computing system may send a message inform the user of the error and requesting the user to retake the photo. At operation 710, the method may optionally include applying or associating a signature or a unique code with each back side image. This may include one or more of: extracting a signature from a signed check and applying the signature to back side images; receiving a digital signature (e.g., from stylus or finger input, or a data store) and applying the digital signature to the back side images; generating a unique code for each check and applying or associating the unique code with back side image of a respective check (e.g., upon receiving a user signature button input or upon receiving biometric data for the customer); and/or applying a deposit only indication on the back side images. These techniques may be performed as discuss herein.

In any of the above illustrations, a check holder may be used to obtain front and/or back side images of the checks being deposited. The check holder may be formed from a transparent material (e.g., plastic) with multiple pockets for holding checks. In some examples, the check holder may include anti-glare materials (on at least the front and/or back sides of the pocket portions) to reduce or prevent reflection of outside light sources. In some examples, the check holder may include a built-in light source near/at the edges help to illuminate the checks within the pockets. The pockets may be arranged in multiple rows and/or multiple columns. The check holder or pockets may be rotated (e.g., to obtain front and back side images) in a number of ways. For example, the check holder may be a large plate that sandwiches all checks together and that rotates as one piece. In another example, each pocket of the check holder may have its own rotation mechanism that allows the pockets to be rotated individually or all together at one time. This allows for the checks to all be rotated (e.g., flipped) in a synchronized manner, but also provides an option for the user to lock and unlock individual pockets so each pocket (and check therein) may rotate individually. Rotation of the check holder or individual pockets may be performed by manual action or motorization. The use of a check holder may provide a number of benefits, including providing a neat and non-overlapping arrangement of checks and reducing or eliminating ambiguity when matching individual back images to individual front images.

One example of a check holder 1000 is illustrated in FIGS. 10A-10D. With reference to FIG. 10A, the check holder 1000 includes a plate 1002 having multiple pockets 1004 for holding checks. While four pockets 1004 are shown, the plate 1002 may have more (or fewer) pockets. The plate 1002 may be rotatably attached to a stand 1006 using pivots 1008. FIG. 10B illustrates the check holder 1000 with the front of the checks facing to the left. FIG. 10C illustrates the check holder 1000 in rotation. FIG. 10D illustrates the check holder 1000 with the back of the checks facing to the left. Rotation of the plates may be performed manually or with motorization. The pockets 1004 may be transparent and may include anti-glare material to reduce or prevent reflection of outside light sources. The check holder 1000 may further include one or more built-in light sources (e.g., LED lights), such as light sources at one or both the side edges of the plate 1002 and/or light sources 1010 at one or both top and bottom edges of the plate 1002, to illuminate the checks in the pockets 1004. A light source may in addition or alternatively by placed on the legs of the stand 1006. Light sources may be provided on both the front and back sides of the check holder 1000.

Figures 11A, 11B, 11C, 11D:
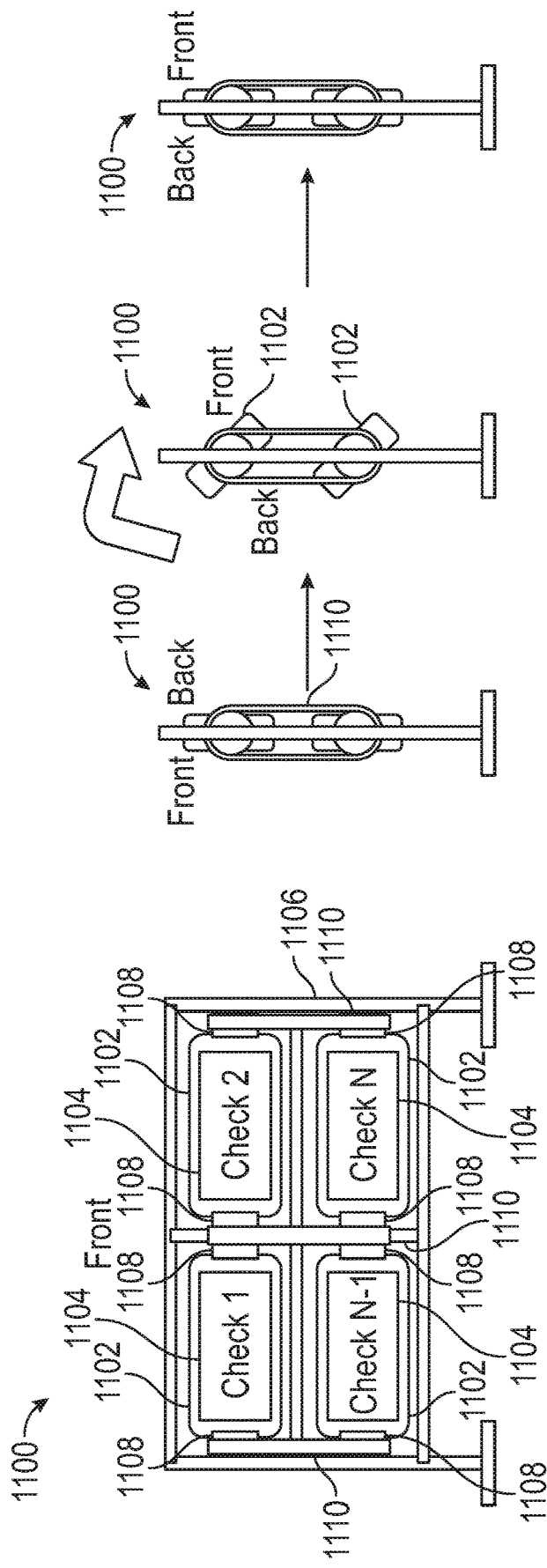
FIGS. 11A-11D illustrate a multi-plate check holder in accordance with some embodiments.

Another example of a check holder 1100 is illustrated in FIGS. 11A-11D. With reference to FIG. 11A, the check holder 1100 includes multiple plates 1102 each having a pocket 1104 for holding checks. While four plates/pockets 1102/1104 are shown, the check holder 1100 may include more (or fewer) plates 1102 and pockets 1104. Each plate 1102 may be rotatably attached to a stand 1106 using pivots 1108. A rotation mechanism 1110 may be provided to rotate each plate. The rotation mechanism 1110 may, for example, be a set of belts or gears or chains. In other embodiments, only a single belt, chain, or gear may be used. FIG. 11B illustrates the check holder 1100 with the front of the checks facing to the left. FIG. 11C illustrates the check holder 1100 in rotation. In this example, the plates 1102 rotate together in synchronization. In other embodiments, the check holder 1100 may include a latch the allows a user to decouple one or more plates 1102 from the rotation mechanism to allow for independent movement of one or more plates 1102. FIG. 11D illustrates the check holder 1100 with the back of the checks facing to the left. The rotation mechanism 1110 of the plates 1102 may be operated manually or by motorization. The pockets 1104 may be transparent and may include anti-glare material to reduce or prevent reflection of outside light sources. The check holder 1100 may further include one or more built-in light sources (e.g., LED lights) to illuminate the checks. A light source may be provided on top, bottom and/or side edges of each plate 1102 and/or on a top frame member, bottom frame member, middle frame member, and/or side frame members of the stand 1106. Light sources may be provided on both the front and back sides of the check holder 1100.

Figure 8:
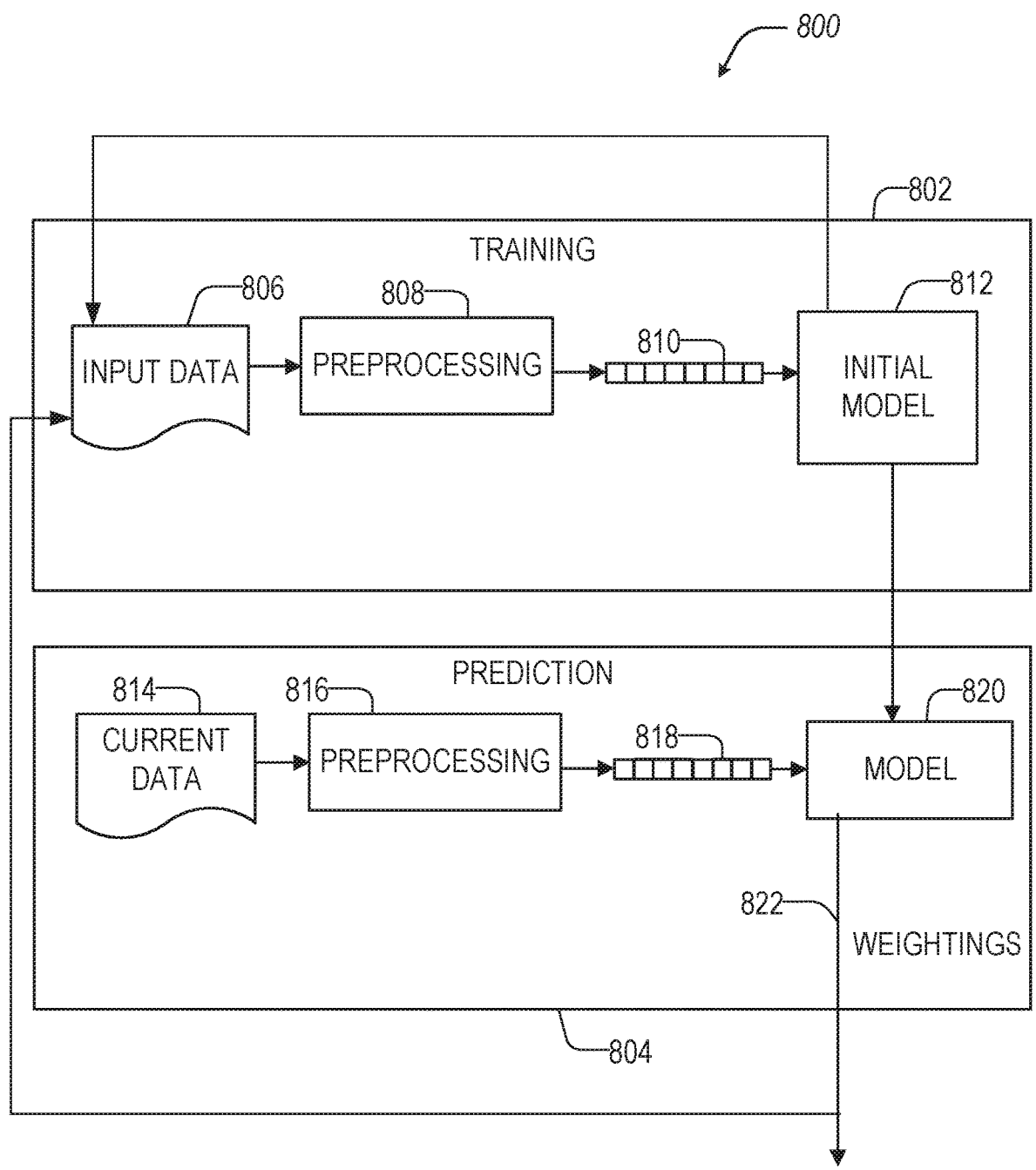
FIG. 8 illustrates a machine learning engine for training and execution related to back side images in accordance with some embodiments.

FIG. 8 illustrates a machine learning engine for training and execution related to capturing and/or depositing simultaneously captured checks with some embodiments. In one example, a machine learning engine may be used to determine (e.g., match, verify, etc.) which back side image of a check goes with which front side image or may be used to determine a back side image from a set of base images to use with a certain front side image. The machine learning (ML) engine can be deployed to execute at a mobile device (e.g., a cell phone) or a computer. For example, with reference to FIG. 1, an ML engine may be part of the bank computing system 110 or may operate on machine separate from the bank computing system 110 (e.g., in a cloud system, on a user device, etc.). A system may calculate one or more weightings for criteria based upon one or more machine learning algorithms. FIG. 8 shows an example machine learning engine 800 according to some examples of the present disclosure.

Machine learning engine 800 utilizes a training engine 802 and a prediction engine 804. Training engine 402 uses input data 406, after undergoing preprocessing component 808, to determine one or more features 810. The one or more features 810 may be used to generate an initial model 812, which may be updated iteratively or with future unlabeled data. The input data 806 may include sets of front and matching back side images for numerous checks, including checks from different banks, checks with different sizes, shapes, folds, etc.

In the prediction engine 804, current data 814 may be input to preprocessing component 816. In some examples, preprocessing component 816 and preprocessing component 808 are the same. The prediction engine 804 produces feature vector 818 from the preprocessed current data, which is input into the model 820 to generate one or more criteria weightings 822. The criteria weightings 822 may be used to output a prediction, as discussed further below. The current data 814 may include front side images of checks captured by a user device, back side images of checks (e.g., in embodiments where back sides are captured), user signatures, template back side images, etc.

The training engine 802 may operate in an offline manner to train the model 820 (e.g., on a server). The prediction engine 804 may be designed to operate in an online manner (e.g., in real-time, at a mobile device, on a cloud system, etc.). In other examples, the training engine 802 may operate in an online manner (e.g., in real-time, at a mobile device, on a cloud system, etc.). In some examples, the model 820 may be periodically updated via additional training (e.g., via updated input data 806 or based on labeled or unlabeled data output in the weightings 822) or feedback (e.g., feedback from users, delegates, bank personnel, etc.). The initial model 812 may be updated using further input data 806 until a satisfactory model 820 is generated. The model 820 generation may be stopped according to a specified criteria (e.g., after sufficient input data is used, such as 1,000, 10,000, 100,000 data points, etc.) or when data converges (e.g., similar inputs produce similar outputs).

The specific machine learning algorithm used for the training engine 802 may be selected from among many different potential supervised or unsupervised machine learning algorithms. Examples of supervised learning algorithms include artificial neural networks, Bayesian networks, instance-based learning, support vector machines, decision trees (e.g., Iterative Dichotomiser 3, C9.5, Classification and Regression Tree (CART), Chi-squared Automatic Interaction Detector (CHAID), and the like), random forests, linear classifiers, quadratic classifiers, k-nearest neighbor, linear regression, logistic regression, and hidden Markov models. Examples of unsupervised learning algorithms include expectation-maximization algorithms, vector quantization, and information bottleneck method. Unsupervised models may not have a training engine 802. In an example embodiment, a regression model is used and the model 820 is a vector of coefficients corresponding to a learned importance for each of the features in the vector of features 810, 818. Once trained, the model 820 may output a base back side image to use with a captured front side image (e.g., a generic back side image, a template back side image, a back side image to be used with a signature, etc.); or may determine a match between a captured back side image and a captured front side image, for example.

Figure 9:
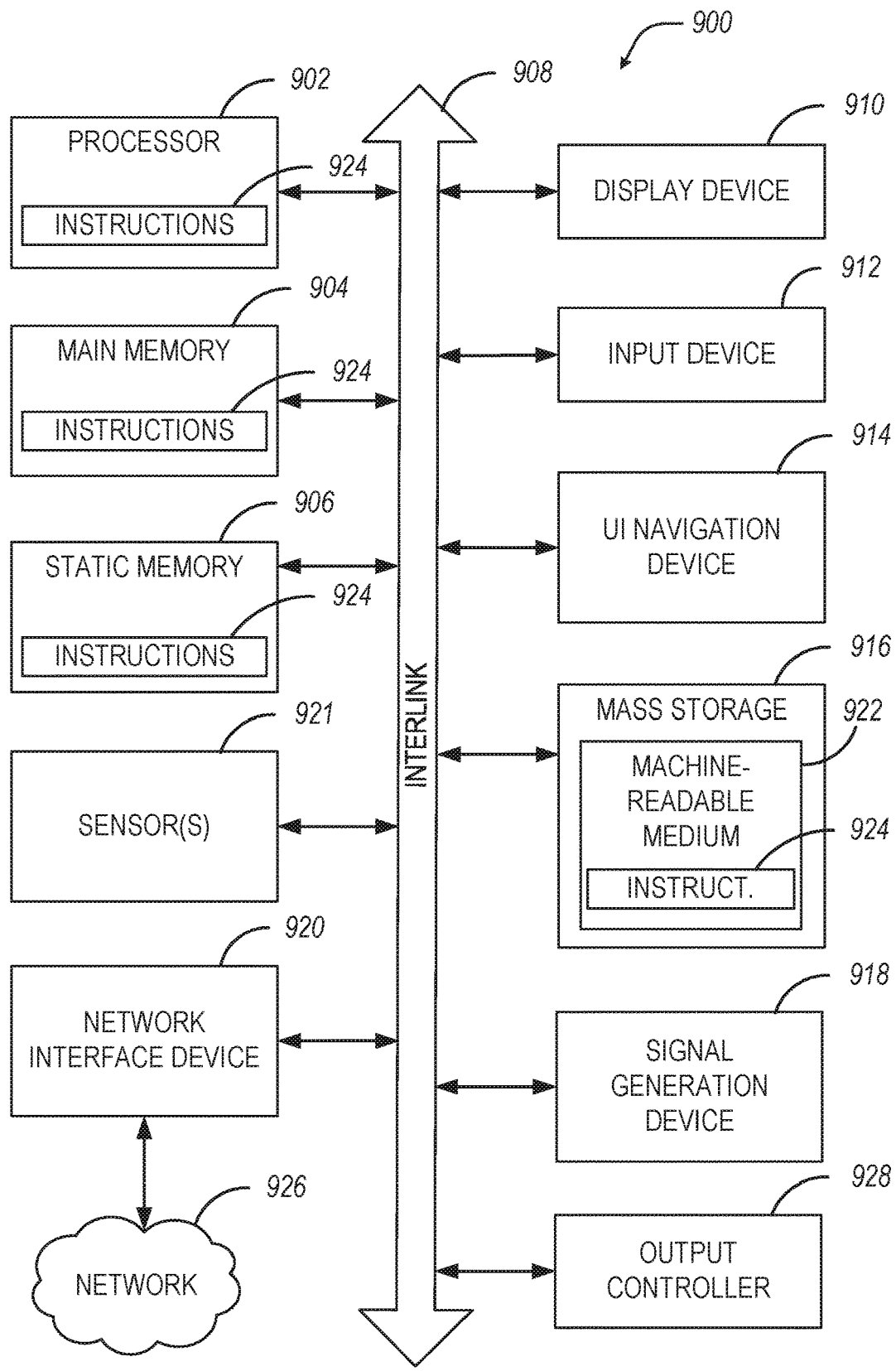
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a server, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. For example, a machine 900 may be a server running at an issuing bank. Similarly, a machine 900 may be configured to implement the functionality of a payment identification component, a recurring transaction component, and/or a notification component or the like. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine-readable medium. In an example, the software, when executed by the underlying hardware of the component, causes the hardware to perform the specified operations.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which components are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular component at one instance of time and to constitute a different component at a different instance of time.

Machine (e.g., computing system) 900 may include a hardware processor 902 (e.g., a central processing unit (CPU), a graphics processing unit (GPU), a hardware processor core, or any combination thereof), a main memory 904 and a static memory 909, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 919, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.)

The storage device 916 may include a machine-readable medium 922 on which is stored one or more sets of data structures or instructions 924 (e.g., software) embodying or utilized by any one or more of the techniques or functions described herein. The instructions 924 may also reside, completely or at least partially, within the main memory 904, within static memory 909, or within the hardware processor 902 during execution thereof by the machine 900. In an example, one or any combination of the hardware processor 902, the main memory 904, the static memory 909, or the storage device 919 may constitute machine-readable media.

While the machine-readable medium 922 is illustrated as a single medium, the term "machine-readable medium" may include a single medium or multiple media (e.g., a centralized or distributed database, and/or associated caches and servers) configured to store the one or more instructions 924.

The term "machine-readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine-readable media. In some examples, machine-readable media may include machine-readable media that is not a transitory propagating signal.

The instructions 924 may further be transmitted or received over a communications network 929 using a transmission medium via the network interface device 920. The Machine 900 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.19 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 920 may include one or more physical jacks (e.g., Ethernet, coaxial, or phone jacks) or one or more antennas to connect to the communications network 929. In an example, the network interface device 920 may include a plurality of antennas to wirelessly communicate using at least one of single-input multiple-output (SIMO), multiple-input multiple-output (MIMO), or multiple-input single-output (MISO) techniques. In some examples, the network interface device 920 may wirelessly communicate using Multiple User MIMO techniques.

VARIOUS NOTES AND EXAMPLES

Example 1 is a method, comprising: receiving, by a bank computing system and from a user device, a multi-check image depicting a front side of multiple checks for deposit with a bank during a communication session; generating, by the bank computing system, a front side image for each of the multiple checks from the multi-check image; receiving, by the bank computing system, electronic signature data for a customer, during the communication session, for the multiple checks, the electronic signature data being received from a source other than a check image; generating, by the bank computing system, back side data for each of the multiple checks using the electronic signature data; generating, by the bank computing system, a check image file for each respective check of the multiple checks, each check image file including the back side data and the front side image for a respective check; and processing a check deposit for each respective check using the check image file for the respective check.

In Example 2, the subject matter of Example 1 optionally includes wherein receiving the electronic signature data includes receiving a digital signature of the customer; wherein generating the back side data for each of the multiple checks includes applying the digital signature to a base check image for each of the multiple checks.

In Example 3, the subject matter of Example 2 optionally includes wherein receiving the digital signature from the customer includes receiving a finger or stylus input.

In Example 4, the subject matter of any one or more of Examples 2-3 optionally includes wherein receiving the digital signature from the customer includes receiving the digital signature from the user device, a separate device, or a data store.

In Example 5, the subject matter of any one or more of Examples 2-4 optionally includes wherein receiving the electronic signature data includes receiving biometric data for the customer or receiving an indication indicating that no signature is necessary.

In Example 6, the subject matter of any one or more of Examples 1-5 optionally includes wherein receiving the electronic signature data includes receiving a signature button selection message, wherein generating the back side data for each of the multiple checks includes generating a unique code for each of the multiple checks and associating the unique code with a respective check.

In Example 7, the subject matter of Example 6 optionally includes wherein receiving the signature button selection message includes receiving the message from the user device.

In Example 8, the subject matter of any one or more of Examples 6-7 optionally includes wherein receiving the signature button selection includes receiving the message from a device separate from the user device.

In Example 9, the subject matter of any one or more of Examples 6-8 optionally includes wherein associating the unique code with the respective check includes at least one of applying the code to a back side image or storing the code in a data store with an association with the respective check.

In Example 10, the subject matter of any one or more of Examples 1-9 optionally includes wherein generating the back side data for each of the multiple checks includes using a base back side image for each of the multiple checks, wherein the base back side image for a respective check is one of a captured image of the back side of the respective check, a generic image of a check back side, or a selected image of a check back side.

In Example 11, the subject matter of Example 10 optionally includes selecting the selected image of a check back side from a database of back side images, wherein the selection uses the front side image of the respective check and a machine learning algorithm to identify the selected image for the respective check.

Example 12 is a computing device, comprising: one or more processors; memory, the memory storing instructions, which when executed by the one or more processors, cause the computing device to perform operations comprising: receiving, from a user device, a multi-check image depicting a front side of multiple checks for deposit with a bank during a communication session; generating a front side image for each of the multiple checks from the multi-check image; storing the front side image for each of the multiple checks in a respective check image file; receiving electronic signature data for a customer, during the communication session, for the multiple checks, the electronic signature data being received from a source other than a check image; generating back side data for each of the multiple checks using the electronic signature data; storing the back side data for each respective check in the check image file for the respective check, wherein the back side data and the front side image for a respective check are stored in the check image file for the respective check; and processing a check deposit for each respective check using the check image file for the respective check.

In Example 13, the subject matter of Example 12 optionally includes wherein receiving the electronic signature data includes receiving a digital signature of the customer; wherein generating the back side data for each of the multiple checks includes applying the digital signature to a base check image for each of the multiple checks.

In Example 14, the subject matter of any one or more of Examples 12-13 optionally includes wherein receiving the electronic signature data includes receiving a signature button selection message, wherein generating the back side data for each of the multiple checks includes generating a unique code for each of the multiple checks and associating the unique code with a respective check.

In Example 15, the subject matter of Example 14 optionally includes wherein associating the unique code with the respective check includes at least one of applying the code to a back side image or storing the code in a data store with an association with the respective check.

In Example 16, the subject matter of any one or more of Examples 1-15 optionally includes wherein generating the back side data for each of the multiple checks includes using a base back side image for each of the multiple checks, wherein the base back side image for a respective check is one of a captured image of the back side of the respective check, a generic image of a check back side, or a selected image of a check back side.

Example 17 is a non-transitory machine-readable medium, storing instructions, which when executed by a machine, causes the machine to perform operations comprising: receiving, from a user device, a multi-check image depicting a front side of multiple checks for deposit with a bank during a communication session; generating a front side image for each of the multiple checks from the multi-check image; receiving electronic signature data for a customer, during the communication session, for the multiple checks, the electronic signature data being received from a source other than a check image; generating back side data for each of the multiple checks using the electronic signature data; storing the back side data and front side image for each respective check in a respective check image file for the respective check; and processing a check deposit for each respective check using the check image file for the respective check.

In Example 18, the subject matter of Example 17 optionally includes wherein generating the back side data for each of the multiple checks includes applying a digital signature to a base check image for each of the multiple checks.

In Example 19, the subject matter of any one or more of Examples 17-18 optionally includes wherein generating the back side data for each of the multiple checks includes generating a unique code for each of the multiple checks and associating the unique code with a respective check.

In Example 20, the subject matter of Example 19 optionally includes wherein associating the unique code with the respective check includes at least one of applying the code to a back side image or storing the code in a data store with an association with the respective check.

ADDITIONAL NOTES

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments may be used, such as by one of ordinary skill in the art upon reviewing the above description. The Abstract is to allow the reader to quickly ascertain the nature of the technical disclosure and is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

What is claimed is:

1. A method, comprising:
receiving, by a bank computing system and from a user device, a multi-check image depicting a front side of multiple checks for deposit with a bank during a communication session;
generating, by the bank computing system, a front side image for each of the multiple checks from the multi-check image;
receiving, by the bank computing system, electronic signature data for a customer via a single user input at the user device, during the communication session, the single user input applying to all of the multiple checks, the electronic signature data being received from a source other than a check image;
generating, by the bank computing system, back side data for each of the multiple checks using the electronic signature data, the electronic signature data applied to the back side data of each of the multiple checks;
generating, by the bank computing system, a check image file for each respective check of the multiple checks, each check image file including the back side data and the front side image for a respective check; and
processing a check deposit for each respective check using the check image file for the respective check.

2. The method of claim 1, wherein receiving the electronic signature data includes receiving a digital signature of the customer; wherein generating the back side data for each of the multiple checks includes applying the digital signature to a base check image for each of the multiple checks.

3. The method of claim 2, wherein receiving the digital signature from the customer includes receiving a finger or stylus input.

4. The method of claim 2, wherein receiving the digital signature from the customer includes receiving the digital signature from the user device, a separate device, or a data store.

5. The method of claim 1, wherein receiving the electronic signature data includes receiving biometric data for the customer or receiving an indication indicating that no signature is necessary.

6. The method of claim 1, wherein receiving the electronic signature data includes receiving a signature button selection message, wherein generating the back side data for each of the multiple checks includes generating a unique code for each of the multiple checks and associating the unique code with a respective check.

7. The method of claim 6, wherein receiving the signature button selection message includes receiving the message from the user device.

8. The method of claim 6, wherein receiving the signature button message selection includes receiving the message from a device separate from the user device.

9. The method of claim 6, wherein associating the unique code with the respective check includes at least one of applying the code to a back side image or storing the code in a data store with an association with the respective check.

10. The method of claim 1, wherein generating the back side data for each of the multiple checks includes using a base back side image for each of the multiple checks, wherein the base back side image for a respective check is one of a captured image of the back side of the respective check, a generic image of a check back side, or a selected image of a check back side.

11. The method of claim 10, further including selecting the selected image of a check back side from a database of back side images, wherein the selection uses the front side image of the respective check and a machine learning algorithm to identify the selected image for the respective check.

12. A computing device, comprising:
one or more processors;
memory, the memory storing instructions, which when executed by the one or more processors, cause the computing device to perform operations comprising:
receiving, from a user device, a multi-check image depicting a front side of multiple checks for deposit with a bank during a communication session;
generating a front side image for each of the multiple checks from the multi-check image;
storing the front side image for each of the multiple checks in a respective check image file;
receiving electronic signature data for a customer via a single user input at the user device, during the communication session, the single user input applying to all of the multiple checks, the electronic signature data being received from a source other than a check image;
generating back side data for each of the multiple checks using the electronic signature data, the electronic signature data applied to the back side data of each of the multiple checks;
storing the back side data for each respective check in the check image file for the respective check, wherein the back side data and the front side image for a respective check are stored in the check image file for the respective check; and
processing a check deposit for each respective check using the check image file for the respective check.

13. The computing device of claim 12, wherein receiving the electronic signature data includes receiving a digital signature of the customer; wherein generating the back side data for each of the multiple checks includes applying the digital signature to a base check image for each of the multiple checks.

14. The computing device of claim 12, wherein receiving the electronic signature data includes receiving a signature button selection message, wherein generating the back side data for each of the multiple checks includes generating a unique code for each of the multiple checks and associating the unique code with a respective check.

15. The computing device of claim 14, wherein associating the unique code with the respective check includes at least one of applying the code to a back side image or storing the code in a data store with an association with the respective check.

16. The computing device of claim 12, wherein generating the back side data for each of the multiple checks includes using a base back side image for each of the multiple checks, wherein the base back side image for a respective check is one of a captured image of the back side of the respective check, a generic image of a check back side, or a selected image of a check back side.

17. A non-transitory machine-readable medium, storing instructions, which when executed by a machine, causes the machine to perform operations comprising:
   receiving, from a user device, a multi-check image depicting a front side of multiple checks for deposit with a bank during a communication session;
   generating a front side image for each of the multiple checks from the multi-check image;
   receiving electronic signature data for a customer via a single user input at the user device, during the communication session, the single user input applying to all of the multiple checks, the electronic signature data being received from a source other than a check image;
   generating back side data for each of the multiple checks using the electronic signature data, the electronic signature data applied to the back side data of each of the multiple checks;
   storing the back side data and front side image for each respective check in a respective check image file for the respective check; and
   processing a check deposit for each respective check using the check image file for the respective check.

18. The non-transitory machine-readable medium of claim 17, wherein generating the back side data for each of the multiple checks includes applying a digital signature to a base check image for each of the multiple checks.

19. The non-transitory machine-readable medium of claim 17, wherein generating the back side data for each of the multiple checks includes generating a unique code for each of the multiple checks and associating the unique code with a respective check.

20. The non-transitory machine-readable medium of claim 19, wherein associating the unique code with the respective check includes at least one of applying the code to a back side image or storing the code in a data store with an association with the respective check.

* * * * *